United States Patent
Porter

[11] 3,919,443
[45] Nov. 11, 1975

[54] CONSTRUCTION PANEL HAVING OVERLAPPING EDGES AND FOAM BACKING

[75] Inventor: William H. Porter, Holland, Mich.

[73] Assignee: W. H. Porter, Inc., Holland, Mich.

[22] Filed: Aug. 17, 1973

[21] Appl. No.: 389,178

Related U.S. Application Data

[63] Continuation-in-part of Ser. No. 367,113, June 5, 1973, abandoned, which is a continuation of Ser. No. 159,295, July 2, 1971, abandoned.

[52] U.S. Cl. ............ 428/81; 52/309; 52/578; 52/595; 52/615; 428/99; 428/77; 428/320
[51] Int. Cl.² .... B32B 3/02; B32B 5/18; E04C 1/30; E04C 2/38
[58] Field of Search ............ 161/44, 145, 111, 160; 52/586, 520, 593, 309, 615, 595, 753 W, 578

[56] References Cited
UNITED STATES PATENTS

| | | | |
|---|---|---|---|
| 1,674,288 | 6/1928 | Levine | 52/578 |
| 3,000,144 | 9/1961 | Kitson | 52/309 |
| 3,088,558 | 5/1963 | Dickinson | 52/615 |
| 3,327,447 | 6/1967 | Nissley | 52/593 |
| 3,331,173 | 7/1967 | Elsner | 52/593 X |
| 3,706,172 | 12/1972 | Keith | 52/595 |

*Primary Examiner*—Philip Dier
*Attorney, Agent, or Firm*—Gordon W. Hueschen

[57] ABSTRACT

A prefabricated panel of substantially uniform width and thickness comprising a foamed sheet or slab of a plastic material, and a rigid facing sheet bonded to one surface of the foamed slab, the facing sheet extending beyond the outermost edges of the foamed slab at at least two opposite edges to define flanges, one of the flanges being coplanar with the facing sheet, and the opposite flange being debossed to permit the coplanar flange of an adjacent panel to overlap the debossed flange and to have its outer surface substantially coplanar with the surface of the adjacent panel, the other surface of the foamed slab being exposed for adhesive bonding to the surface of a supporting structure such as an interior wall or ceiling.

12 Claims, 4 Drawing Figures

CONSTRUCTION PANEL HAVING OVERLAPPING EDGES AND FOAM BACKING

CROSS-REFERENCE TO RELATED APPLICATION

This application is a continuation-in-part of copending Ser. No. 367,113, filed June 5, 1973, for "Insulating Panel Construction," by the present inventor, which in turn is a continuation of application Ser. No. 159,295, filed July 2, 1971, for "Insulating Panel Construction," by the present inventor, now abandoned.

BACKGROUND OF THE INVENTION

The present invention relates to building materials and is more particularly concerned with prefabricated panels for interior walls and ceilings formed of plastic materials.

Prefabricated panels for use as building materials and particularly for building interior walls and ceilings are known in the art. A major problem of construction in using such materials is to affix them securely to the supporting wall so that they will remain in fixed relationship over long periods of time and under varied conditions. Adhesive bonding has been utilized but is often unsuccessful because the nature of the material of the surface bonded is not proper for obtaining a strong permanent bond. Fastening materials such as nails are often used, but with most materials it is difficult to conceal the nails in order to achieve an attractive surface. Additionally, joints between adjacent panels in many types of construction often remain open.

SUMMARY OF THE INVENTION

It is an object of the present invention to provide a prefabricated construction panel for interior walls and ceilings. It is a further object to provide a constructional panel which may be affixed to a supporting base by adhesive bonding, and which does not require additional fastening means such as nails. It is still another object to provide a construction panel which provides a readily maintainable surface. It is still another object to provide a construction panel which is affixed to a supporting base by means not outwardly visible. It is still another object to provide such a panel which may be readily constructed from available materials and with conventional machinery. Still other objects will readily present themselves to one skilled in the art upon reference to the ensuing specification, the drawing, and the claims.

According to the invention, a prefabricated construction panel is provided comprising a plastic foamed sheet having a rigid facing sheet bonding to one surface thereof, the other surface of the foamed sheet remaining exposed for adhesion to a wall, with the facing sheet extending beyond the foremost edges of the foamed sheet on at least two edges to provide flanges, one coaxial with the facing sheet and the other debossed sufficiently to have a coplanar flange of an adjacent panel in overlapping relationship therewith. In mounting the panels either on a wall or a ceiling, they are affixed to the supporting surface by means of a suitable adhesive material such as a mastic adhesive. The porous surface of the foamed sheet is of such nature that it permits an excellent adhesive bond to be made between the foamed sheet and the supporting structure. Additionally, fastening means such as nails may be driven through the debossed flanges and covered by the coplanar flange of an adjacent panel to completely obscure the means of affixation.

DESCRIPTION OF THE PREFERRED EMBODIMENT

Figure 1:
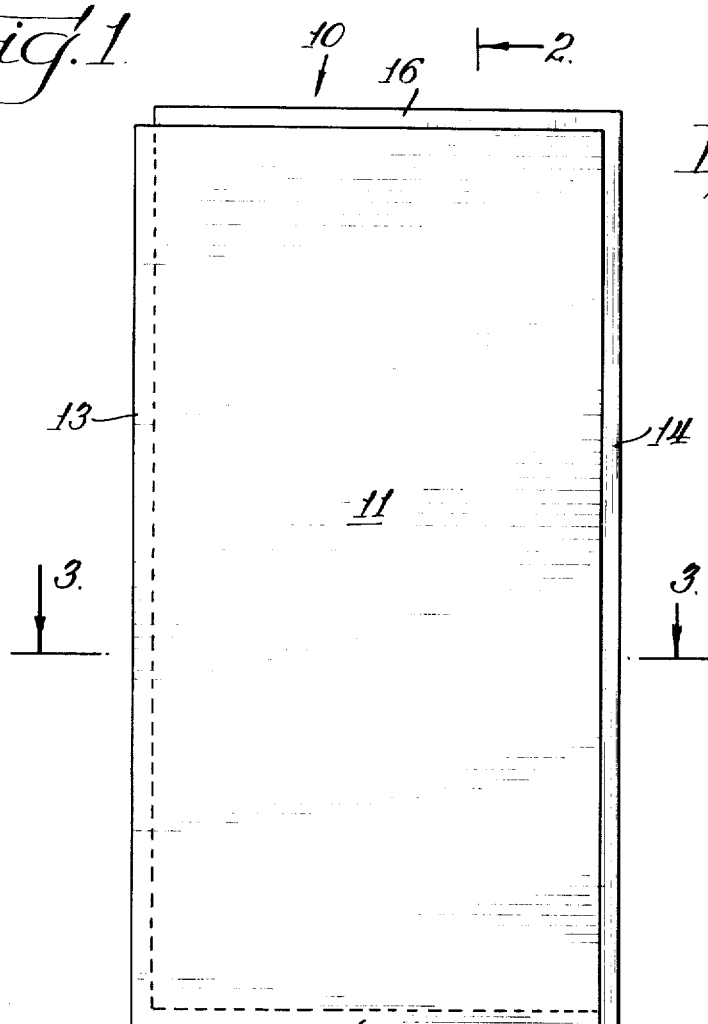
FIG. 1 is a plan view of a prefabricated construction panel according to the invention having flanges provided on all four sides.
Figure 2:
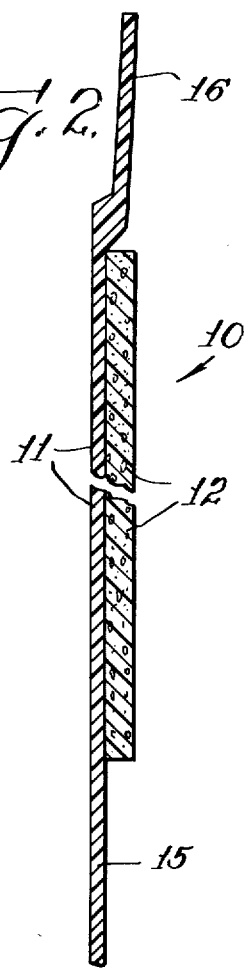
FIG. 2 is a cross-sectional view taken at the line 2—2 of FIG. 1, looking in the direction of the arrows.
Figure 3:
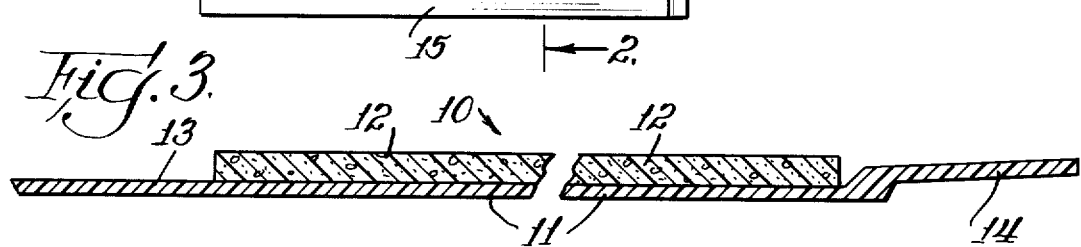
FIG. 3 is a cross-sectional view taken at the line 3—3 of FIG. 1, looking in the direction of the arrows.

Referring to FIGS. 1–3, a prefabricated construction panel 10 according to the invention is shown comprising a rigid facing sheet 11 bonded by a suitable adhesive to a foamed sheet 12 of a plastic material. The facing sheet 11 extends at one lateral margin beyond the foremost edge of the foamed sheet 12 to provide a coplanar flange 13, both surfaces of which are unbroken or free of appendages and coplanar with the surfaces of the facing sheet of which they are a part. The opposite lateral surface the edge of the facing sheet 11 extends beyond the foremost outer edge of the foamed sheet 12 and is debossed to form a debossed flange 14. In structures where the length of the panel 10 is such that it extends the full height of the wall from the floor to the ceiling, the upper and lower ends of the panel may be cut so that the facing sheet and foamed sheet edges are coextensive. However, in applications where the wall is higher than the length of the panel 10 or where a large ceiling is to be covered, a second coplanar flange 15 may be provided at one end and a second debossed flange 16 may be provided at the other end. Such structures are particularly useful in covering a large ceiling. However, when no more than two panels are utilized in any direction for covering a high wall or ceiling, a debossed flange 16 may be provided only on the end of one panel and a coplanar flange 15 may be provided only on the adjacent end of the other panel, the edges of the ends engaging the floor and ceiling having facing sheet and foamed sheet edges which are coextensive.

Figure 4:
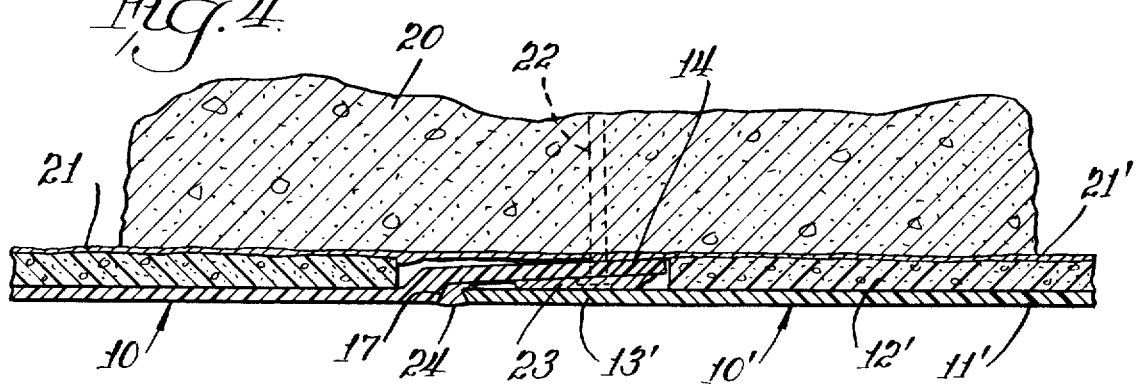
FIG. 4 is a fragmentary cross-sectional view showing portions of adjacent panels affixed to a supporting wall structure.

FIG. 4 illustrates a combination in which adjacent panels are affixed to a supporting wall or ceiling 20, which may be formed of plaster, wallboard, wood, or any other suitable construction material. First, the panel 10 is coated with a mastic-type adhesive 21. Alternatively, the wall may be coated with the adhesive or both the wall and the panel may be coated with the adhesive. The panel 10 is then applied to the surface of the wall 20 and the adhesive 21 permitted to set. Although not necessary, if desired, a nail 22 may be driven through the debossed flange 14 and into the wall for assistance in rendering the panel more secure. When it is desired to utilize nails for securing the panel through the debossed flange, special consideration should be given to the dimensions of the structure. In order to have a structure in which the surfaces of adjacent panels are flush or coplanar, it is necessary that the debossed flange be debossed sufficiently to accept the full thickness of the coplanar flange. Consequently the depth of debossment is governed by the thickness of the coplanar flange. A further consideration is that in order to drive a nail through the debossed flange and affix it in engagement with the supporting surface, the thickness of the foamed sheet 12 should be so designed so that its exposed surface is substantially flush with the lower surface of the debossed flange, or at least sufficiently thin so that the debossed flange does not encounter an inordinate amount of bending before its forward edge engages the supporting wall. Next an adjacent panel 10' is similarly coated with an adhesive 21' and applied to the wall 20 with the coplanar flange 13' overlapping the debossed flange 14. If desired, an adhesive material 23 may be applied between the coplanar flange 13' and the debossed flange 14, prior to application of the panel 10' to form a vaporproof seal. The adhesive 23 may be advantageously chosen from among materials which remain somewhat soft and tacky, so that a seal is maintained even though thermal expansion and contraction might cause the flanges to move longitudinally. Additionally, if desired, the edge of the overlapping coplanar flange 13' and the debossment shoulder 17 may be spaced apart to provide a slot into which a sealing material or filler 24 may be introduced to result in an unbroken outer surface across the joint, as shown in FIG. 4. After all the adhesive materials have set, the result is a tightly bonded paneled wall or ceiling which is strong, readily cleaned, and which resists normal wear or damage over long periods of use.

The foamed sheet 12 may be formed of any suitable plastic material such as polystyrene, polyurethane, phenolformaldehyde, polyvinyl chloride, polyethylene, polypropylene, and many other materials known in the art. The preferred material is polystyrene foam, since this material appears to have the right consistency, strength, resistance to distortion, and provides a highly porous surface which forms an excellent adhesive bond with the supporting wall structure.

The facing sheet 11 is preferably formed of fiberglass-reinforced polyester resin. Additionally, other resins may be utilized such as polyurethane, phenolformaldehyde, polyethylene, polypropylene, polyvinyl chloride, and others known in the art. Other commonly used reinforcing fibers such as mineral fibers or synthetic fibers may be utilized instead of fiberglass. Where the additional strength is not required, the fibrous material may be completely eliminated.

The adhesive for bonding the foamed sheet to the facing sheet may be an epoxy resin or any other suitable adhesive compatible with the materials used. The adhesive utilized for bonding the exposed surface of the foamed sheet to a supporting wall surface may be any of a large number of adhesives commonly used in the building art. A preferred adhesive is that known as a mastic adhesive. The adhesive 23 used intermediate the debossed flange and the coplanar flange, where such an adhesive is used, may be any commonly known adhesive. Where longitudinal expansion of the panels may occur, it is desirable to use an adhesive which remains soft and pliable over extended periods of time to permit the flanges to move longitudinally with respepct to each other while still maintaining a seal. The adhesive 24 may be any suitable type such as spackling compound, a hardenable plastic filling material, or any other suitable material which provides a seal and which can be smoothed to have a surface coplanar with the surfaces of the adjacent panels.

It is to be understood that the invention is not to be limited to the exact details of operation or structures shown and described, as obvious modifications and equivalents will be apparent to one skilled in the art.

I claim:

1. A prefabricated panel of substantially uniform width and thickness, adapted to be adhesively affixed to a supporting surface and to interlock with an adjacent panel of the same type, comprising a foamed sheet of a plastic material;

a rigid facing sheet bonded to the foamed sheet on one side thereof leaving one surface of the foamed sheet exposed;

an integral, sheet-form planar flange member along one edge of the facing sheet and extending beyond the foremost underlying edge of the foamed sheet and having its surfaces coplanar with the surfaces of said facing sheet; and an integral, debossed flange member along a facing sheet edge substantially parallel to said planar flange member extending beyond the formost underlying edge of the foamed sheet, the depth of debossment of said debossed flange member being sufficient to accept the thickness of said coplanar flange, whereby said planar flange member overlaps a debossed flange member of an adjacent panel of the same type and engages only the outer surface of said debossed flange when adjacent panels are interlocked.

2. A prefabricated panel according to claim 1, wherein the lower surface of the debossed flange is substantially coplanar with the exposed surface of the foamed sheet.

3. A prefabricated panel according to claim 1, having a coplanar flange along two sides of the panel and having a debossed flange along the other two sides of the panel.

4. A prefabricated panel according to claim 1, wherein said foamed sheet is composed of polystyrene.

5. A prefabricated panel according to claim 1, wherein said facing sheet is composed of fiberglass-reinforced polyester resin.

6. In combination, means defining a support surface and a plurality of abutting, interlocked prefabricated panels, each panel comprising a foamed sheet of a plastic material;

a rigid facing sheet bonded to the foamed sheet on one side thereof leaving one surface of said foamed sheet exposed;

an integral, sheet-form planar flange member along one edge of the facing sheet and extending beyond the foremost underlying edge of the foamed sheet and having its surfaces coplanar with the surfaces of said facing sheet; and an integral, debossed flange member along a facing sheet edge substantially parallel to said planar flange member extending beyond the foremost underlying edge of the foamed sheet, the depth of debossment of said debossed flange member being sufficient to accept the thickness of said coplanar flange, the exposed side of each of said foamed sheets being adhesively affixed to said supporting surface, and the planar flange member of each panel overlapping the debossed flange member of an adjacent panel and engaging only the outer surface of said debossed flange.

7. The combination according to claim 6, wherein the adhesive affixing the surface of each foamed sheet to said supporting surface is a mastic-type adhesive.

8. The combination according to claim 6, wherein said foamed sheet is composed of polystyrene.

9. The combination according to claim 6, wherein said facing sheet is composed of fiberglass-reinforced polyester resin.

10. The combination according to claim 6, wherein said debossed flanges have nails disposed therethrough, the ends of said nails being disposed in said supporting surface, whereby said debossed flanges are additionally affixed to said supporting surface.

11. The combination according to claim 6, wherein an adhesive is provided between each debossed flange and coplanar flange of soft and tacky consistency whereby longitudinal movement between adjacent panels may take place while maintaining said flanges in sealed condition.

12. The combination according to claim 6, wherein the edge of each coplanar flange is spaced apart from the shoulder formed at the proximal edge of the adjacent debossed flange, and a filling material is positioned in the space therebetween having its outer surface coplanar with the surfaces of said coplanar flange and the adjacent panel.

* * * * *